US005675093A

United States Patent [19]
Young et al.

[11] Patent Number: 5,675,093
[45] Date of Patent: Oct. 7, 1997

[54] CORIOLIS MASS FLOW SENSOR INCLUDING A SINGLE CONNECTION AND SUPPORT STRUCTURE

[75] Inventors: Alan M. Young, Los Gatos; Danny Hoang, San Jose, both of Calif.

[73] Assignee: Endress+Hauser Flowtec AG, Reinach, Switzerland

[21] Appl. No.: 527,436

[22] Filed: Sep. 13, 1995

[51] Int. Cl.[6] ........................................ G01F 1/84
[52] U.S. Cl. ........................................ 73/861.355
[58] Field of Search ................ 73/861.38, 861.354, 73/861.355, 861.356, 861.357

[56] References Cited

U.S. PATENT DOCUMENTS

| 4,655,089 | 4/1987  | Kappelt et al | 73/861.38 |
|-----------|---------|---------------|-----------|
| 4,716,771 | 1/1988  | Kane          | 73/861.38 |
| 4,733,569 | 3/1988  | Kelsey et al. | 73/861.38 |
| 4,911,020 | 3/1990  | Thompson      | 73/861.38 |
| 5,271,281 | 12/1993 | Mattar et al. | 73/861.38 |
| 5,355,737 | 10/1994 | Lew et al.    | 73/861.38 |
| 5,357,811 | 10/1994 | Hoang         | 73/861.38 |
| 5,379,649 | 1/1995  | Kalotay       | 73/861.38 |
| 5,423,221 | 6/1995  | Kane et al.   | 73/861.38 |

FOREIGN PATENT DOCUMENTS

| 0 239 679 A1 | 4/1986  | European Pat. Off. | G01F 1/80 |
| 0 239 679 B1 | 4/1986  | European Pat. Off. | G01F 1/80 |
| 0 421 812 A1 | 5/1990  | European Pat. Off. | G01F 1/84 |
| 41 38 840 A1 | 11/1991 | Germany            | G01F 1/84 |

OTHER PUBLICATIONS

K-Flow, Inc., Equipment Information/Specification Sheet, "Mass Flow Meters with B-Tubes, Quiet Mode Oscillation, and Center Balancing Design" 1986.

K-Flow, Inc., Design Perspective Report, "Vibration Isolation and Structural Integrity: Resolving the Remaining Design Challenges in Coriolis-Based Mass Flow Measurement" 1987.

European Patent Office Search Report for EP 95 81 0767.

*Primary Examiner*—George M. Dombroske
*Assistant Examiner*—Paul D. Amrozowicz
*Attorney, Agent, or Firm*—Claude A. S. Hamrick

[57] ABSTRACT

Improved Coriolis mass flow sensor including a single connection and support structure having an in-line inlet and outlet and a one-piece, generally helical sensing tube structure wound in concentric fashion about the in-line axis of the support structure and supported relative thereto by tube ends affixed to ports formed in the support structure and in fluid communication with the inlet and outlet flow paths. The tube extends through approximately 720° as it wraps about the centerline axis, and carries actuator means at its 12 o'clock position and sensors at the quarter hour positions on opposite sides of the device centerline. A pair of node plates are disposed at spaced-apart locations on the tube side opposite the actuator and serve to couple the centermost loop section to the downstream tail and the centermost loop section to the upstream tail, respectively.

14 Claims, 3 Drawing Sheets

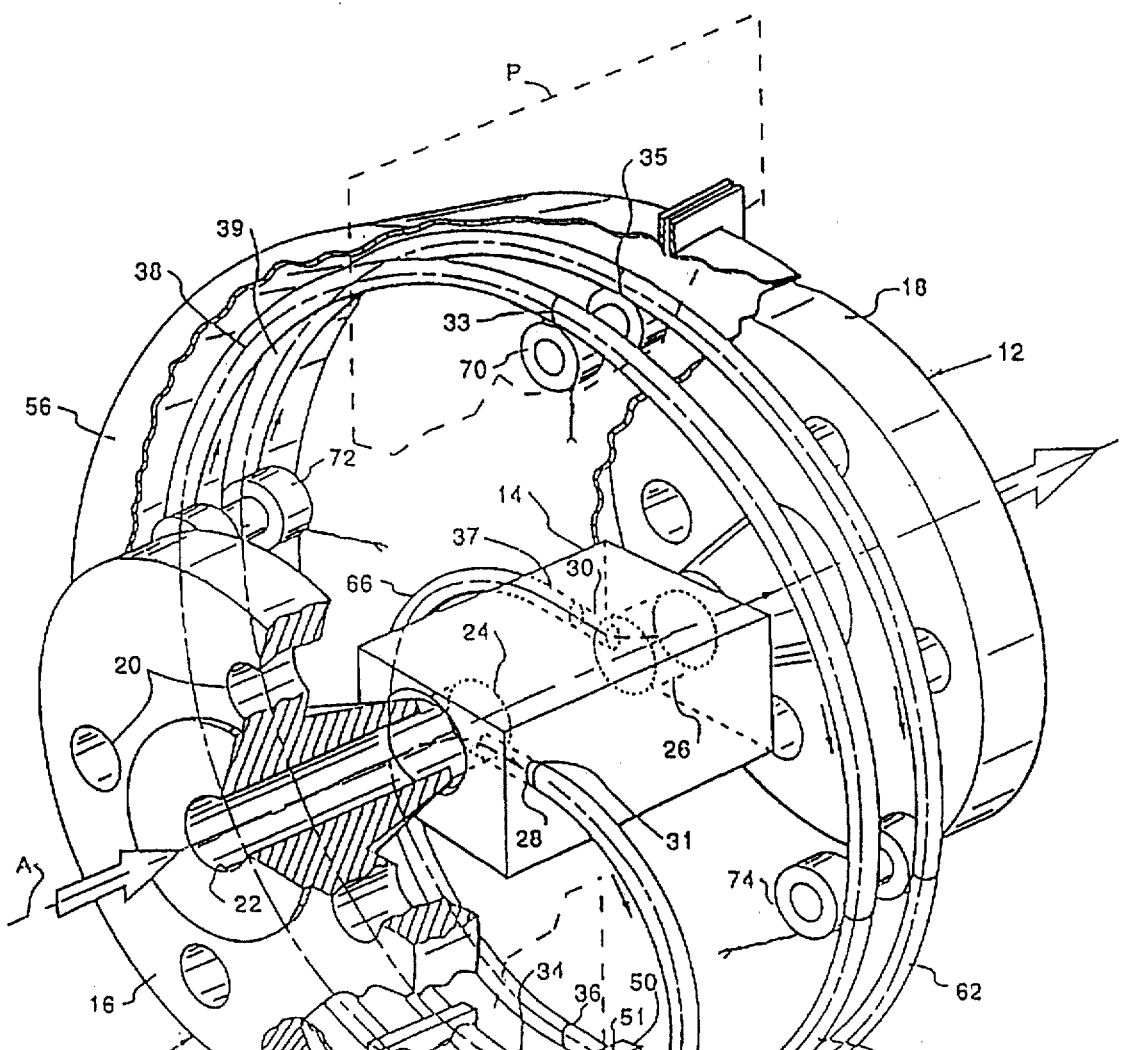
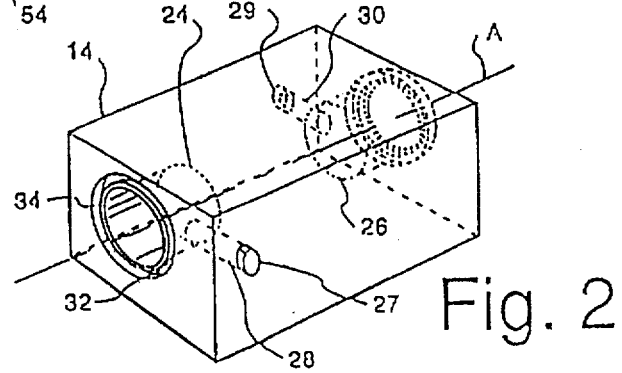
Fig. 1
Fig. 2

1

CORIOLIS MASS FLOW SENSOR INCLUDING A SINGLE CONNECTION AND SUPPORT STRUCTURE

BACKGROUND OF THE INVENTION

1. Field of the Invention

The present invention relates generally to Coriolis-type mass flow meters, and more particularly to an improved single-tube mass flow sensor for use in a Coriolis mass flow meter.

2. Brief Description of the Prior Art

The use of Coriolis principles to measure mass flow has been known for more than fifty years. Early on, workers such as Wilfred Roth and Anatole Sipin recognized the benefits of using such principles and suggested numerous flow tube sensor configurations and measurement techniques. However, it was not until the general availability of the microprocessor in the mid-70s that implementation of the techniques suggested by the early workers became feasible. At this juncture, measurement techniques and operational principles are well known, and Coriolis mass flow sensors having tube diameters ranging from small fractions of an inch to more than a foot are in widespread use. It is no longer the motion-sensing or electronic signal-processing functions that stand in the way of progress in Coriolis flow meter technology and general availability; it is the cost and difficulty of making flow sensing structures having higher mechanical sensitivity and reliability that keeps the price up and the general acceptance of these types of meters down.

One of the problems associated with existing flow sensor technology is that errors are introduced into the measurement by mechanical stresses imparted to the flow tube sensor structure by the pipeline to which the sensor is connected. Attempts at isolating flow tube structures from pipeline stresses have generally followed two lines. One is to use a massive cast or machine manifold structure that forms a rigid connection between opposing pipeline ends and has flow-sensing tubes extending outwardly therefrom. Examples of such structures are disclosed in the U.S. Patents of Mattar et al. (U.S. Pat. No. 4,891,991), Thompson (U.S. Pat. No. 4,911,020), Yard et al. (U.S. Pat. No. 4,957,005), Hussain et al. (U.S. Pat. No. 5,048,350), Thompson (U.S. Pat. No. 5,050,439), Mattar (U.S. Pat. No. 5,054,326 and 5,343,764), and Kalotay et al. (U.S. Pat. No. 5,349,872). With the exception of the Yard et al. design, meters such as those disclosed in these patents have not clearly addressed the issues of simplicity, ease of manufacture, and compactness of design. Yard et al. were on the right track in that their device meets most of these criteria. However, their design still does not isolate tube mechanics from flow line coupling mechanics.

Other attempts to isolate the flow sensor from pipeline stresses are disclosed in the U.S. Patents to Kane (U.S. Pat. No. 4,716,771), Back-Pedersen et al. (U.S. Pat. No. 5,020,375 and 5,031,468), and Hoang (U.S. Pat. No. 5,357,811). Although each of these designs do in fact provide a degree of isolation between pipeline and active portions of the sensor tube, as well as simplicity of construction, they suffer from other factors relating to vulnerability to shear force effects, out-of-line inlet and outlet, and lack of compactness.

SUMMARY OF THE INVENTION

It is therefore a principal objective of the present invention to provide a Coriolis mass flow sensor device which is relatively inexpensive to manufacture, compact in that it occupies a relatively small volume of space, substantially free of mechanical stress weaknesses, and has the advantages associated with substantial symmetry.

Another object of the present invention is to provide a mass flow sensor of the type described having a rigid unitary inlet and outlet structure with inlet and outlet in line with the pipeline to which it is to be connected so as not to require pipeline offset or flow-diverting manifold features.

Still another objective of the present invention is to provide a flow sensor of the type described having its center of mass spatially located as close as possible to the geometrical center of the device.

Briefly, a presently preferred embodiment of the invention includes a single connection and support structure having an in-line inlet and outlet and a one-piece, generally helical sensing tube structure wound in concentric fashion about the in-line axis of the support structure and supported relative thereto by tube ends affixed to ports formed in the support structure and in fluid communication with the inlet and outlet flow paths. The tube extends through approximately 720° as it wraps about the centerline axis, and carries actuator means at its 12 o'clock position and sensors at the quarter hour positions on opposite sides of the device centerline. A pair of node plates are disposed at spaced-apart locations on the tube side opposite the actuator and serve to couple the centermost loop section to the downstream tail and the centermost loop section to the upstream tail, respectively.

An important advantage of the present invention is that it can be made with a simple cast part or parts requiring a minimum of machining and a minimum of weld joints.

Another advantage of the present invention is that, since the sense tube is helically wrapped about the connection structure, the volume occupied by the device is minimal.

Still another advantage of the present invention is that its sensor tube can be made from either a single length of tubing or from a plurality of segments joined together to form a continuous length of conduit.

These and other advantages of the present invention will no doubt become apparent to those skilled in the art after having read the following detailed description of the preferred embodiment which is illustrated in the several figures of the drawing.

IN THE DRAWING

FIG. 1 is a partially broken perspective view illustrating a Coriolis mass flow sensor in accordance with the present invention;

FIG. 2 is a perspective view illustrating more clearly the machining detail of the connector block of the preferred embodiment of FIG. 1;

DETAILED DESCRIPTION OF THE PREFERRED EMBODIMENT

Figure 3:
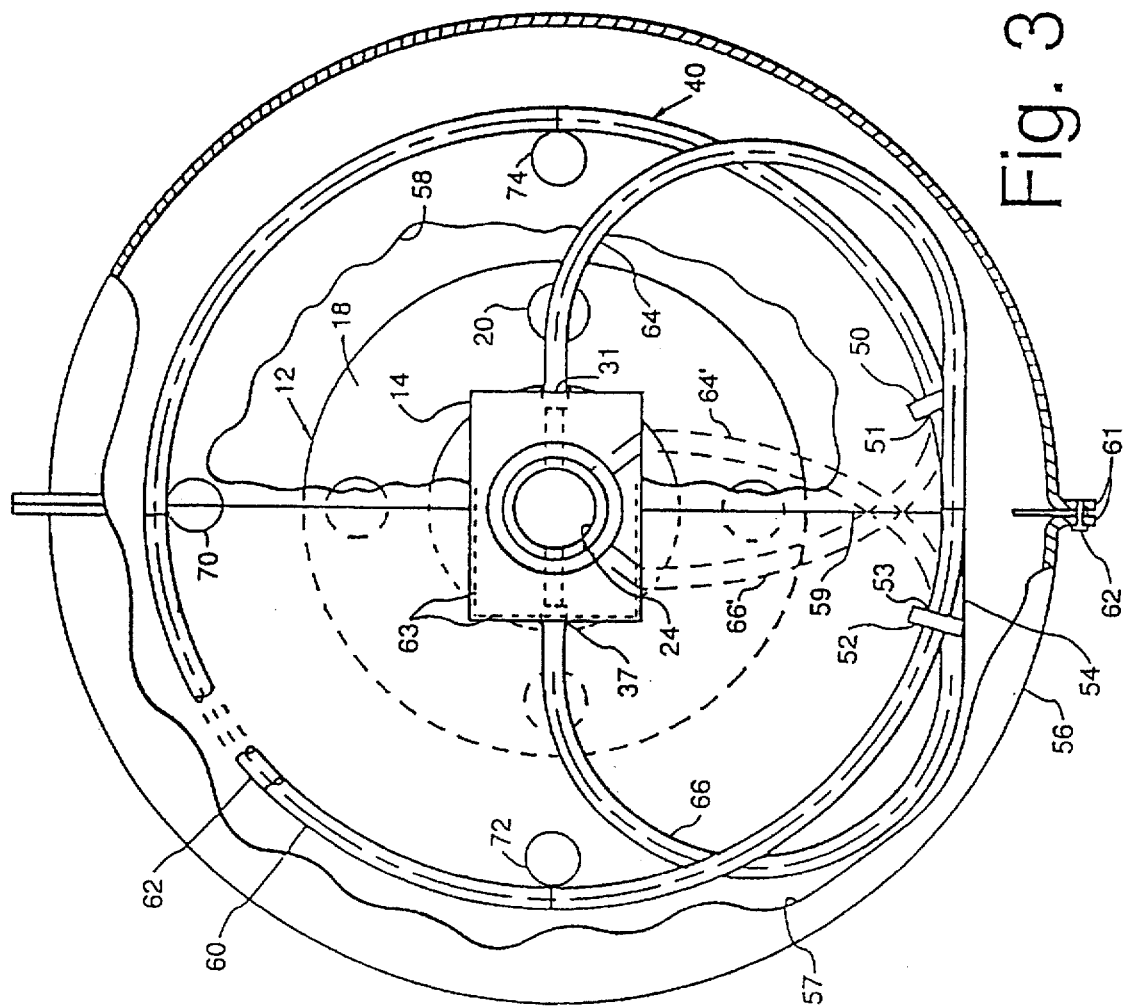
FIG. 3 is an end view of the embodiment of FIG. 1 with the near end flange removed and illustrating connection of tube ends to center block.

Referring now to FIG. 1 of the drawing, a Coriolis mass flow sensor in accordance with the present invention is depicted, including an inlet bell 10 and outlet bell 12 rigidly joined together by a center block 14 to form a rigid junction structure for joining together two axially aligned but separated ends of a pipeline intended to conduct a flow of mass to be measured. As illustrated, the external extremities of the bells 10 and 12 form flanges 16 and 18, respectively, having a plurality of bolt holes 20 formed therein for use in mounting the device to the end flanges of a connecting pipeline (not shown). The bells 10 and 12 also include a central bore 22 for receiving and discharging the mass flow stream. As revealed by the upper broken-away portion of bell 10 and as will be described in more detail below, the internal extremities of the bells 10 and 12 are affixed by brazing or welding to opposite ends of center block 14.

Center block 14 is typically a solid block of metallic material, either machined or cast, and includes a pair of bores 24 and 26 axially aligned with each other and with the axis A of the bell bores 22. The bores preferably extend less than halfway into block 14 from either end. The diameter of the bores 24 and 26 is substantially identical to the diameter of the bore 22 in the bells 10 and 12. Extending into opposite sides of block 14 so as to intersect bores 24 and 26 are laterally extending bores 28 and 30.

Circumscribing block 14 and having its ends weldedly affixed thereto so as to be in flow-communicating relationship with the bores 28 and 30 is a length of conduit tubing 40 which may be of a single length, deformed in substantially helical fashion about a central axis, or may include a plurality of segments suitably joined together. The length of tubing beginning at 31 is rather tightly bent through 180° and intersects an imaginary vertical plane P (at 32) that passes through and includes axis A. Tube 40 is then bent through another 180° before it again intersects plane P at 33. Following another 180° bend, tube 40 once more intersects plane P at 34, is bent another 180° to again encounter plane P at 35, is bent once more to intersect plane P at 36, and finally is folded back to engage block 14 at 37. Note that passing around block 14 the tubular helix includes two tube lengths 38 and 39 disposed parallel to each other, and respectively extending between points 32 and 34 to complete one tube loop, and points 34 and 36 to complete another tube loop. Upstream and downstream tail segments respectively extend from point 31 to point 32, and from point 36 to point 37. Note also that in the lower portion of the helix three tubular portions extend substantially parallel to each other with the exception that the tails on either end are turned more tightly so that they intersect block 14 as indicated.

At the bottom of the loops, as depicted, and spaced apart a suitable distance on either side of plane P, are a pair of rigid node plates 50 and 52 which join remote portions of loops 38 and 39 to define active loop portions 60 and 62 which extend in parallel, equal-spaced relationship around block 14 from node plate 50 to node plate 52. Node plates 50 and 52 are preferably welded or brazed to tube 40 and are rigid enough so as to resist bending as a result of any forces applied thereto by loop portions 60 and 62. The plates 50 and 52 are typically spaced apart at least one, and preferably several times the loop-to-loop spacing between loop portions 60 and 62.

Disposed at the upper intersections with imaginary plane P, loop portions 60 and 62 respectively carry the components of a loop driver 70 which, when actuated, serves to drive the upper extremities of the loops toward and away from each other in oscillatory fashion. Note that the resulting stresses developed at the node plates are primarily torsional as opposed to bending. Accordingly, the likelihood of weld failure at the junctions with node plates 50 and 52 is substantially lower than would be expected with cantilevered U-tube designs and the like. It will also be apparent that the active part of the device formed by the loop portions 60 and 62 is flexibly suspended from the block 14 by the tail segments 64 and 66, respectively extending from point 31 to the intersection with node plate 52 at 53, and from point 37 to point 51 at node plate 50. External forces transmitted through the pipeline will in large part be transmitted across block 14 and absorbed by the tail segments 64 and 66, and not extend beyond the node plates 50 and 52.

Moreover, those skilled in the art will recognize that the only direct connection between the node plates 50 and 52 is through the tube segment 54, and any torsional or other force applied to the ends thereof will be equal but opposite in direction. Accordingly, such forces will be cancelled in segment 54 and will have no adverse effect on operation of the active loops 60 and 62.

Appropriately positioned on opposite sides of block 14 and carried by the loop portions 60 and 62 are a pair of loop stress, motion or displacement detectors 72 and 74 which detect differential stress, motion or displacement of the respective loop portions relative to each other as a result of Coriolis forces arising as mass flows through the loops as actuator 70 drives them to and fro. It is of course understood that the driver 70 and detectors 72 and 74 may be of any suitable design and placement so as to provide a desired degree of sensitivity for the sensor. Furthermore, any other suitable drive/detector configurations and placements can be utilized with the loop structure of the present invention. Even though not specifically shown in the drawing, it will be understood that the complete Coriolis mass flow meter will include appropriate driving and signal detecting electronics coupled to driver 70 and detectors 72 and 74, as well as signal processing and indicating means well known in the art.

Although only partially depicted, it will be appreciated that a suitable multipart housing 56 enveloping the sensor components in the region between the flanges may also be provided.

Turning now to FIG. 2 of the drawing, details of the construction of block 14 will be described. Block 14 may either be machined from a solid block if suitable material or may be molded or cast and then machined as appropriate. Generally speaking, and in the case where block 14 is a machined part, the block is fabricated by boring inlet and outlet cavities 24 and 26 into opposite ends of the block along the axis A, and cutting a circumscribing channel 32 around each bore so as to leave an annular sleeve 34 to which the ends of bells 10 and 12 may be welded. Laterally extending passageways 28 and 30 are then bored with appropriate counterbores 29 and 31 to intersect bores 24 and 26 respectively. The diameter of bores 24 and 26 is preferably the same as the diameter of the bores 22 in bells 10 and 12. The diameters of bores 28 and 30 preferably match the inside diameter of tube 40. The diameter of the counterbores 29 and 31 match the outside diameter of tube 40 so that the tube ends may be inserted thereinto before welding or brazing.

FIG. 3 is an end view looking along the axis A with the bell 10 removed and the inlet side and outlet side of housing 56 broken away at 57 and 58 respectively to reveal various internal details. The housing 56, as illustrated, may be a two part clam-shell type structure having a parting line 59 and securing flanges 61 which may be suitably secured together by bolts 62. Housing 56 may mate with either a portion of the bell tails, or as depicted by the dash lines 63, may mate with a corner or surface groove or flange provided on opposite ends of block 14. The use of flexible seals at the junction will insure that the interior of housing is hermetically sealed.

Figure 4:
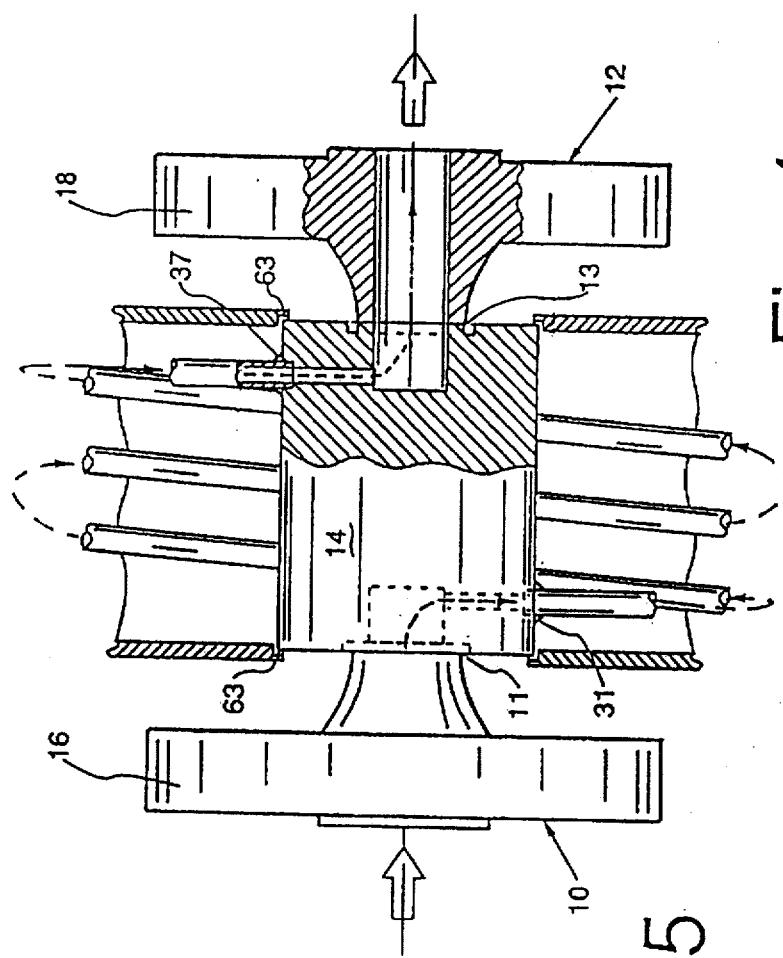
FIG. 4 is a top view of the FIG. 1 embodiment illustrating connection of tube to block.

FIG. 4 is a partially broken top view further illustrating connection of end bells 10 and 12 to housing 14 at 11 and 13 respectively, tube connections to block 14 at 31 and 37 respectively, and housing connection to block 14 at shoulders 63.

Figure 5:
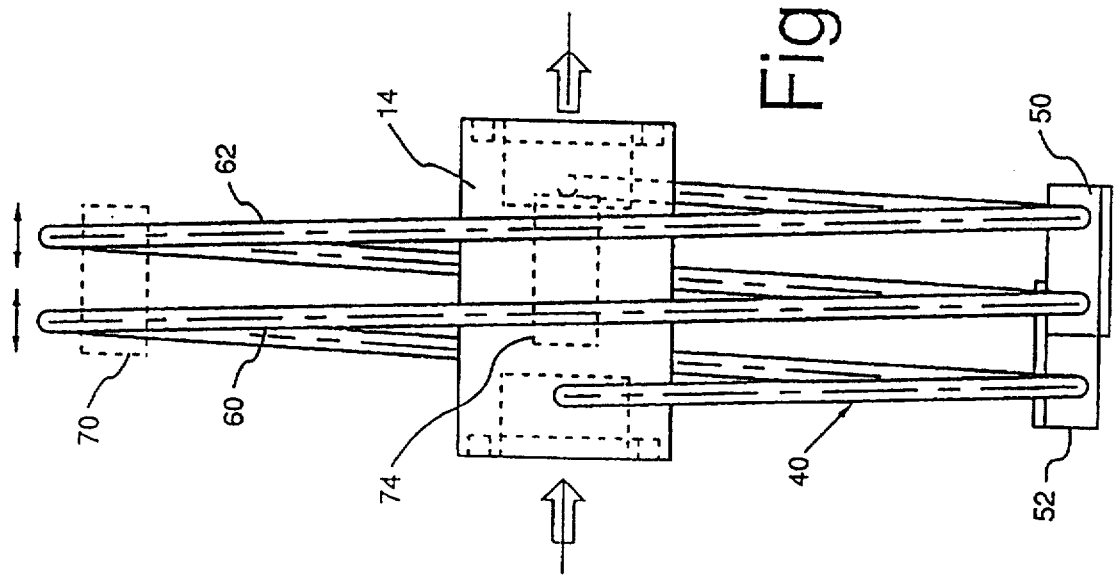
FIG. 5 is a side view of the FIG. 1 embodiment further illustrating connection of tube to block.

FIG. 5 is a side view of the sensor with end bells and housing removed to further reveal the relationship of tube to block and node plates to tube.

The depicted preferred embodiment compares quite favorably with prior art designs in terms of simplicity of manufacture, safety and reliability of use, and ease of installation. It provides substantial rigidity between flow line conduit ends to which it is affixed, substantial support to all its components with no nonlinear stress paths. Since no bending stresses are applied to any welds, the integrity of all welds is less of a concern than in other designs. For example in the design illustrated in U.S. Pat. No. 5,357,811, the ability of the device to withstand longitudinal pipeline shock and vibration is largely a function of the integrity of the tube-to-plate welds (19 and 23 of FIG. 2 of the patent). Note that in the patented design the strength of the coupling from flange-to-flange is limited by the strength of the weld lines. Although this may not be of substantial concern for small tube devices, it can be a limiting factor in larger tube designs.

Furthermore, in the present invention where the flow tube is of a symmetrical helical configuration, the volume of space required to accommodate the flow sensor is symmetrical about the pipeline and at an absolute minimum.

Although the present invention has been described above in terms of a specific embodiment, it is anticipated that alterations and modifications thereof will no doubt become apparent to those skilled in the art. For example, as suggested by the dashed lines 64' and 66' in FIG. 3, the flow tube tails may be coupled to flow exit and re-entry ports formed on a single side (as compared to opposite sides) of the block 14. It will of course also be apparent that for some applications elongated loops or oval-shaped flow tubes may be utilized without departing from the scope of the invention. Moreover, the flow sensor may be inverted as compared to the illustrated configuration. It is therefore intended that the following claims be interpreted as covering all such alterations and modifications as fall within the true spirit and scope of the invention.

What is claimed is:

1. A Coriolis mass flow sensor comprising:

an elongated, rigid junction means for coupling two axially aligned but separated ends of a pipeline intended to conduct a flow of mass to be measured, said junction means having a longitudinal axis for coaxial alignment with that of said pipeline and having a first passageway disposed along said axis and extending axially into one end thereof and mining to form a laterally extending exit port, and having a second passageway disposed along said axis and extending axially into the opposite end thereof and mining to form a laterally extending entrance port;

a length of conduit forming a generally helical flow robe means wrapped around said junction means and having an inlet end coupled to said exit port and an outlet end coupled to said entrance port, said length of conduit intersecting no more than five times an imaginary plane passing vertically through said junction means and including said longitudinal axis, two of such intersections lying above said junction means and three of such intersections lying beneath said junction means;

first node plate means joining together at a point removed from and on one side of said plane a first two of the three conduit portions passing beneath said junction means, and second node plate means independent of said first node plate means and joining together at a point removed from and on the opposite side of said plane, a second two of the three conduit portions, said first and second node plate means respectively serving to define the ends of two active loops of said conduit extending around said junction means, said active loops being generally parallel to each other;

means for driving the uppermost portions of said active loops toward and away from each other in oscillatory fashion; and means for detecting Coriolis induced differences in displacement or motion of one loop relative to the other as said active loops are moved toward and away from each other by said driving means.

2. A Coriolis mass flow sensor as recited in claim 1 wherein said junction means includes a metal block having a first flanged end bell rigidly affixed to one end of the block, and a second flanged end bell rigidly affixed to the other end of the block.

3. A Coriolis mass flow sensor as recited in claim 2 wherein said first passageway is formed by a first bore extending axially into said one end and a second bore extending into said block from one side thereof and in a direction transverse to said axis and intersecting said first bore, and said second passageway is formed by a third bore extending axially into said opposite end and a fourth bore extending into said block from a side opposite said one side and in a direction transverse to said axis and intersecting said third bore.

4. A Coriolis mass flow sensor as recited in claim 3 and further comprising a cylindrically configured two-part housing enveloping said block, said conduit, said driving means, and said detecting means.

5. A Coriolis mass flow sensor as recited in claim 1 wherein said conduit is comprised of a helical portion having an arcuate length of less than 720° and a pair of tail portions respectively extending between said exit port and one end of the helical portion, and from said entrance port to the other end of said helical portion.

6. A Coriolis mass flow sensor as recited in claim 1 wherein said exit port is disposed on one side of said junction means, and said entrance port is disposed on a side of said junction means opposite said one side.

7. A Coriolis mass flow sensor as recited in claim 1 wherein said first and second node plate means are spaced from each other by a distance at least two times the spacing between said two active loops.

8. In a Coriolis mass flow meter apparatus including a flow sensor for insertion in a pipeline having material flowing therethrough and for developing measurement signals corresponding to the mass flowing through the pipeline, and signal processing means responsive to said measurement signals and operative to generate an output indicating the mass flow rate of said material, an improved flow sensor, comprising:

an elongated, rigid junction means for coupling two axially aligned but separated ends of a pipeline intended to conduct a flow of mass to be measured, said junction means having a longitudinal axis for coaxial alignment with that of said pipeline and having a first passageway formed therein and extending axially into one end thereof and mining laterally to form an exit port, and having a second passageway formed therein and extending axially into the opposite end thereof and mining laterally to form an entrance port;

a length of conduit forming a generally helical flow tube means wrapped around said junction means and having an inlet end coupled to said exit port and an outlet end coupled to said entrance port, said length of conduit intersecting no more than five times an imaginary plane passing vertically through said junction means and including said longitudinal axis, two of such intersections lying above said junction means and three of such intersections lying beneath said junction means;

first node plate means joining together at a point removed from and on one side of said plane a first two of the three conduit portions passing beneath said junction means, and second node plate means independent of said first node plate means and joining together at a point removed from and on the opposite side of said plane, a second two of the three conduit portions, said first and second node plate means serving to define the ends of two active loops of said conduit extending out and around said junction means, said active loops being generally parallel to each other;

means for driving the uppermost portions of said active loops toward and away from each other in oscillatory fashion; and means for detecting Coriolis induced differences in displacement or motion of one loop relative to the other as said active loops are moved toward and away from each other by said driving means.

9. In a Coriolis mass flow meter apparatus as recited in claim 8 wherein said junction means includes a metal block having a first ranged end bell rigidly affixed to one end of the block, and a second ranged end bell rigidly affixed to the other end of the block.

10. In a Coriolis mass flow meter apparatus as recited in claim 9 wherein said first passageway is formed by a first bore extending axially into said one end and a second bore extending into said block from one side thereof and in a direction transverse to said axis and intersecting said first bore, and said second passageway is formed by a third bore extending axially into said opposite end and a fourth bore extending into said block from a side opposite said one side and in a direction transverse to said axis and intersecting said third bore.

11. In a Coriolis mass flow meter apparatus as recited in claim 10 and further comprising a cylindrically configured two-part housing enveloping said block, said conduit, said driving means, and said detecting means.

12. In a Coriolis mass flow meter apparatus as recited in claim 8 wherein said conduit is comprised of a helical portion having an arcuate length of less than 720° and a pair of tail portions respectively extending between said exit port and one end of the helical portion, and from said entrance port to the other end of the helical portion.

13. In a Coriolis mass flow meter apparatus as recited in claim 8 wherein said first and second node plate means are spaced from each other by a distance at least two times the spacing between said two active loops.

14. A Coriolis mass flow sensor as recited in claim 4 wherein said first and second node plate means are spaced from each other by a distance at least two times the spacing between said two active loops.

* * * * *